(12) United States Patent  
Hiromatsu

(10) Patent No.: US 7,453,607 B2
(45) Date of Patent: Nov. 18, 2008

(54) IMAGE-READING APPARATUS

(75) Inventor: Kenji Hiromatsu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1053 days.

(21) Appl. No.: 10/411,105

(22) Filed: Apr. 11, 2003

(65) Prior Publication Data

US 2003/0197900 A1 Oct. 23, 2003

(30) Foreign Application Priority Data

Apr. 23, 2002 (JP) ............................ 2002-121079

(51) Int. Cl.
*H04N 1/04* (2006.01)
(52) U.S. Cl. .................. 358/474; 358/497; 358/486; 359/197; 250/234
(58) Field of Classification Search ................ 358/474, 358/199, 408, 497, 486, 494, 483, 482, 514, 358/513, 505, 1.15; 359/197; 250/234
See application file for complete search history.

(56) References Cited

U.S. PATENT DOCUMENTS

| 5,038,028 | A  | * | 8/1991  | Boyd et al. ............... 250/208.1 |
| 6,002,508 | A  | * | 12/1999 | Mai ........................... 359/212 |
| 6,717,102 | B2 | * | 4/2004  | Neev et al. ............. 219/121.68 |
| 6,744,921 | B1 | * | 6/2004  | Uchida et al. .............. 382/185 |
| 6,760,130 | B1 | * | 7/2004  | Asai ........................... 358/474 |
| 6,879,096 | B1 | * | 4/2005  | Miyazaki et al. ........... 313/495 |
| 7,119,933 | B2 | * | 10/2006 | Sugimoto .................... 358/474 |
| 7,161,716 | B1 | * | 1/2007  | Kawasaki et al. .......... 358/497 |
| 7,295,352 | B2 | * | 11/2007 | Hooper et al. .............. 358/474 |
| 2002/0196477 | A1 | * | 12/2002 | Chen ......................... 358/474 |
| 2006/0065903 | A1 | * | 3/2006  | Sakurai et al. .............. 257/82 |

FOREIGN PATENT DOCUMENTS

| EP | 119085 A2 * | 9/1984 |
| JP | 7-203198 | 8/1995 |
| JP | 2000-49988 | 2/2000 |
| JP | 2000-236404 | 8/2000 |

* cited by examiner

*Primary Examiner*—Edward L Coles
*Assistant Examiner*—Negussie Worku
(74) *Attorney, Agent, or Firm*—Fitzpatrick, Cella, Harper & Scinto

(57) ABSTRACT

When an image-reading module moves along and scans a glass plate of an original document bed, a flexible wiring connecting the image-reading module to a fixing point takes various shapes depending on the position of the image-reading module so as to come close to or apart from a second metallic casing of an image-reading apparatus and a first metallic casing accommodating a signal processing unit. Since insulating members are provided on the first metallic casing, a predetermined or more distance between the wiring and the surface of the first metallic casing can be always kept constant, so that an analog signal transmitting through a conductive member within the wiring can be prevented from being largely affected by changes in electrostatic capacitance.

9 Claims, 13 Drawing Sheets

DRAWING FOR ILLUSTRATING UNEVENESS DUE TO ELECTROSTATIC
CAPACITANCE VARIATION WHEN READING HALFTONE CHART WITH 0.3 DENSITY (a)

(b) STRIPE IS NOT GENERATED EVEN IF WIRING 208 STICKS TO METALLIC CASING (c) DENSITY IS NOT CHANGED COMPARED TO (a)

(d) STRIPE IS NOT GENERATED EVEN IF WIRING 208 DROPS AND REBOUNDS AGAINST METALLIC CASING

DRAWING FOR ILLUSTRATING INSULATING SHEET EFFECT

IMAGE-READING APPARATUS

BACKGROUND OF THE INVENTION

1. Field of the Invention

The present invention relates to an image-reading apparatus and an image-forming apparatus, each having an image sensor, and in particular relates to an image-reading apparatus and an image-forming apparatus, each having a contact image sensor.

2. Description of the Related Art

Recently, in response to demand for reduction in cost and electric power consumption of a light source, in addition to an image scanner using a demagnification optical system constituted of a charge coupled device (referred to below as a CCD) and a lens, which are combined therewith, a contact image sensor (referred to below as a CIS) is increasing to be used, which is constituted of a 1× magnification image-forming optical system of a distributed index lens, such as a SELFOC™ lens; and a CCD line sensor or a CMOS (complementary metal-oxide semiconductor) line sensor; which are combined therewith using a light source, such as a light-emitting diode (referred to below as an LED) or a xenon lamp.

For example, when an original document is read at a speed of about 25 ipm (images per minute) with a color copying machine, whereas an original document surface illuminance of about 30,000 lux is necessary for the demagnification optical system using the CCD, an examined review has been obtained in that the contact image sensor can read the sheet at the same reading speed and substantially the same S/N with an original document surface illuminance of about 3,000 lux, which is 1/10 of the above. The CIS has such an advantage.

The CIS also has a feature that an image scanner can be reduced in thickness, weight, and size by using the CIS. Then, in order to follow this feature, a configuration is proposed, in which signal transmission between an image-signal processing circuit board having an image-signal processing circuit for processing an image signal and the CIS is performed using analog signals.

When the signal transmission is performed with analog signals in such a manner, since the CIS need not have a digital circuit mounted thereon for processing an image signal, the reduction in thickness and weight is enabled. In fact, the inventor tried to mount the digital circuit on the CIS, but abandoned it because of the increase in thickness, width, and weight due to the mounting of the circuit board and components.

By the configuration in that a digital signal is not transferred between the CIS and an image-signal processing section, radio wave noise can be reduced. Recently, it is essential to conform to various regulations against producing radio wave noise of United State Federal Communications Committee (FCC) and Voluntary Control Council for Interference by Information Technology Equipment (VCCI), so that an examined result has been obtained in that analog transmission, which can reduce the radio wave noise, is advantageous more than digital transmission.

In such analog transmission, the CIS and the image-signal processing section are connected therebetween using an inexpensive flexible flat cable (referred to below as an FFC) or flexible print circuit (referred to below as an FPC), so that an image signal from the image sensor can be transmitted in an analog state.

On the other hand, in an image scanner section of a copying machine, in consideration of a life enduring the number of scanning times of about one million and pushing a heavy book document on a glass plate of an original document bed, it has been vital to improve the rigidity of a casing of the image-reading apparatus by making it of a metal. If the casing for accommodating the image-signal processing circuit board having the image-signal processing circuit for operating the apparatus with a high-frequency clock is made of a metal, an effect on the radio-wave noise suppression can also be brought out. Therefore, in the copying machine, wiring of the FFC or FPC and the grounded metallic casing exist together.

However, if the metallic casing and the wiring exist together, the capacitance between the wiring and the metallic casing varies with the movement or deformation of the wiring due to the scanning operation, so that the waveform of the analog signal changes, producing a problem. If such unnecessary changes in the waveform are generated, noise is incorporated in the image signal, resulting in unevenness and stripes in the finally produced images, which deteriorate image quality.

The degree of the deterioration in image quality is no longer negligible, and it is so remarkable as being visually and easily recognizable when reading a halftone chart with an optical density D of 0.3. Therefore, such deterioration in image quality significantly reduces the commodity value.

Such deterioration in image quality is not produced in an image scanner having a resin casing for accommodating the image-signal processing circuit board, and it is specific to an image scanner having a metallic casing.

SUMMARY OF THE INVENTION

In view of such problems, the present invention has been made, and it is an object thereof to provide an image-reading apparatus capable of improving image quality when the output of a CIS is an analog signal, and a metallic casing is used in an image-signal processing section.

In order to achieve the object mentioned above, in accordance with an aspect of the present invention, an image-reading apparatus according to the present invention comprises a contact image sensor for reading an image from an original document; a wiring for transmitting an image signal produced by the contact image sensor as an analog signal; an image-signal processing circuit for processing the image signal received from the wiring; a metallic casing for accommodating the image-signal processing circuit therein; and an insulating member formed on a region on the external surface of the metallic casing where the wiring might come into contact with the metallic casing.

In accordance with another aspect of the present invention, an image-reading apparatus according to the present invention comprises a contact image sensor for reading an image from an original document; a wiring for transmitting an image signal produced by the contact image sensor as an analog signal; an image-signal processing circuit for processing the image signal received from the wiring; a first metallic casing for accommodating the contact image sensor, the image-signal processing circuit, and the wiring therein; and a first insulating member formed on a region on the internal surface of the first metallic casing where the wiring might come into contact with the metallic casing.

By the structure described above, waveform deformation of an analog signal due to variations in electrostatic capacitance can be prevented with a simplified and inexpensive configuration. Thereby, unevenness and stripes produced on images corresponding to such deformation can be prevented, enabling image quality to be improved.

Further objects, features and advantages of the present invention will become apparent from the following description of the preferred embodiments with reference to the attached drawings.

DESCRIPTION OF THE PREFERRED EMBODIMENTS

Figure 1:
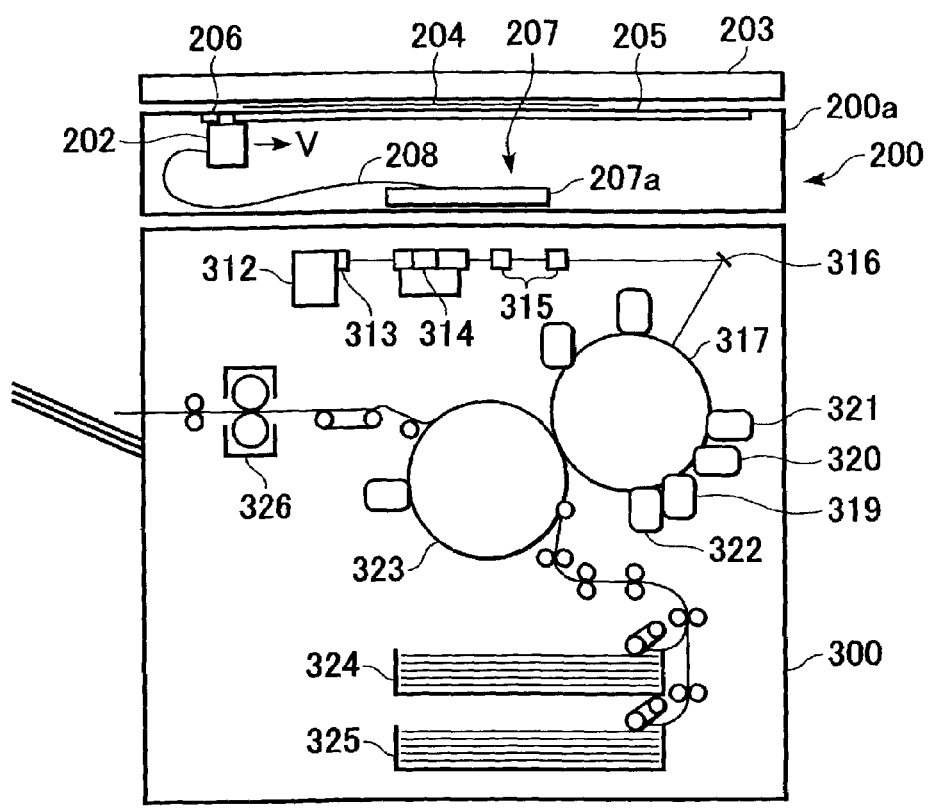
FIG. 1 is a schematic sectional view of a structure of an image-forming apparatus according to an embodiment of the present invention.

An image-reading apparatus and an image-forming apparatus according to an embodiment of the present invention will be specifically described below with reference to the attached drawings. FIG. 1 is a schematic sectional view showing a structure of the image-forming apparatus according to the embodiment of the present invention; and FIG. 2 is a schematic plan view showing an image scanner section 200 in the image-forming apparatus according to the embodiment of the present invention.

The image-forming apparatus according to the embodiment, as shown in FIG. 1, comprises the image scanner section (image-reading device) 200 for reading an original document to perform digital signal processing and a printing section (printing device) 300 for printing an image on paper in full color corresponding to the original document image read by the image scanner section 200.

Figure 2:
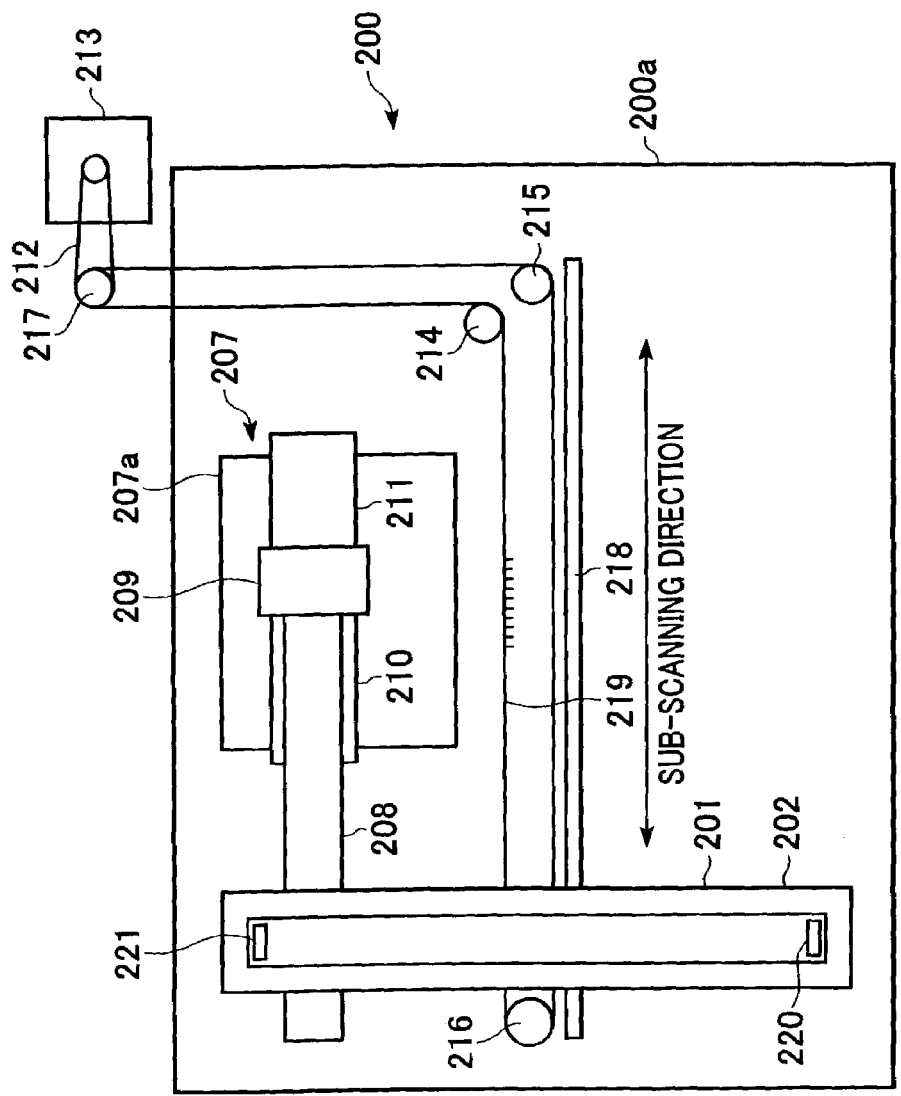
FIG. 2 is a schematic plan view of an image scanner section 200 in the image-forming apparatus according to the embodiment of the present invention.

In the image scanner section 200, as shown in FIGS. 1 and 2, a CIS module 202 is accommodated in a carriage 201 made of a resin. At both ends of the CIS module 202, sliding members 220 and 221 are attached, respectively. The CIS module 202 is constructed so that the sliding members 220 and 221 are pushed on a glass (platen) plate 205 of an original document bed with spring members (not shown) built in the carriage 201. On the glass (platen) plate 205 of the original document bed, an original document 204 is placed, which is pushed on the platen plate 205 by an original document pressure plate 203.

The movement of the carriage 201 is restricted by a linear guide 218 so as to move only in a sub-scanning direction. To a lower part of the carriage 201, a timing belt 219 is connected, which is looped and stretched between pulleys 216 and 217 via pulleys 214 and 215. Around the pulley 217, a timing belt 212 driven by a stepping motor 213 is also looped. Accordingly, the driving force of the stepping motor 213 is transmitted to the timing belt 219 via the timing belt 212 so as to move the carriage 201 in the sub-scanning direction linking it to the movement of the timing belt 219. The operation of the stepping motor 213 is controlled by a CPU 131 (see FIG. 7).

Wiring 208 for transmitting an analog signal produced by the CIS module 202 is connected to a connector 223 of an image-signal processing section 207 (see FIGS. 8A to 8D) via a cable holding member 209 made of a resin. The image-signal processing section 207 comprises a metallic casing and an image-signal processing circuit accommodated within the metallic casing. The wiring 208 is made of a conductive material and a sealing member formed on the surface of the conductive material, and the FFC or FPC may be used therefor; however, it is not specifically limited to these. According to the embodiment, insulating members 210 and 211 are arranged at least in a region where the wiring 208 may come in contact with the metallic casing of the image-signal processing section 207. The insulating members 210 and 211 are provided so as to sandwich the cable holding member 209 therewith in plan view. The shape such as thickness of the insulating members 210 and 211 is not specifically limited; however, it is preferable that the conductive material of the wiring 208 and the metallic casing of the image-signal processing section 207 be insulated with each other while the space therebetween be more than a predetermined distance so that variations in the electrostatic capacitance therebetween consistently do not affect image quality.

The image scanner section 200 is provided with a standard white board 206 as a member for shading correction of read data of the three primary color (red (R), green (G), and blue (B)). The CIS module 202, the image-signal processing section 207, and the wiring 208 are accommodated within a metallic casing (second metallic casing) 200a.

On the other hand, the printing section 300 comprises a laser driver 312 for receiving an image signal produced from the image scanner section 200, a semi-conductor laser 313 to be modulated by the laser driver 312, a polygon mirror 314 to be propagated by a laser beam emitted from the semi-conductor laser 313, and a photosensitive drum 317 to be irradiated with a laser beam reflected by an f-θ lens 315 and a mirror 316. Furthermore, there are provided developers constituted of a magenta (M) developer 319, a cyan (C) developer 320, a yellow (Y) developer 321, and a black (BK) developer 322. These four developers develop M, C, Y, and BK latent images formed on the photosensitive drum 317 with corresponding toner by alternately touching the photosensitive drum 317.

The printing section 300 is further provided with a transfer drum 323 so as to come into contact with the photosensitive drum 317. Around the transfer drum 323, a paper sheet is looped, which is fed from one or more paper cassettes, according to the embodiment, any one of two paper cassettes 324 and 325. The printing section 300 is also provided with a fuser 326 for transferring toner images developed on the photosensitive drum 317 onto a paper sheet.

Figure 3:
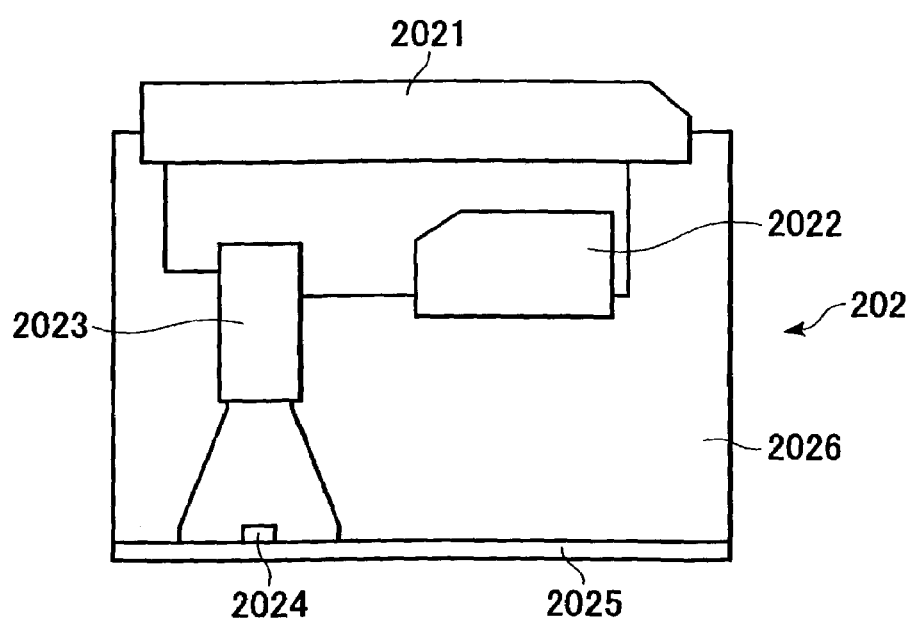
FIG. 3 is a sectional view of a structure of a CIS module 202.
Figure 4:
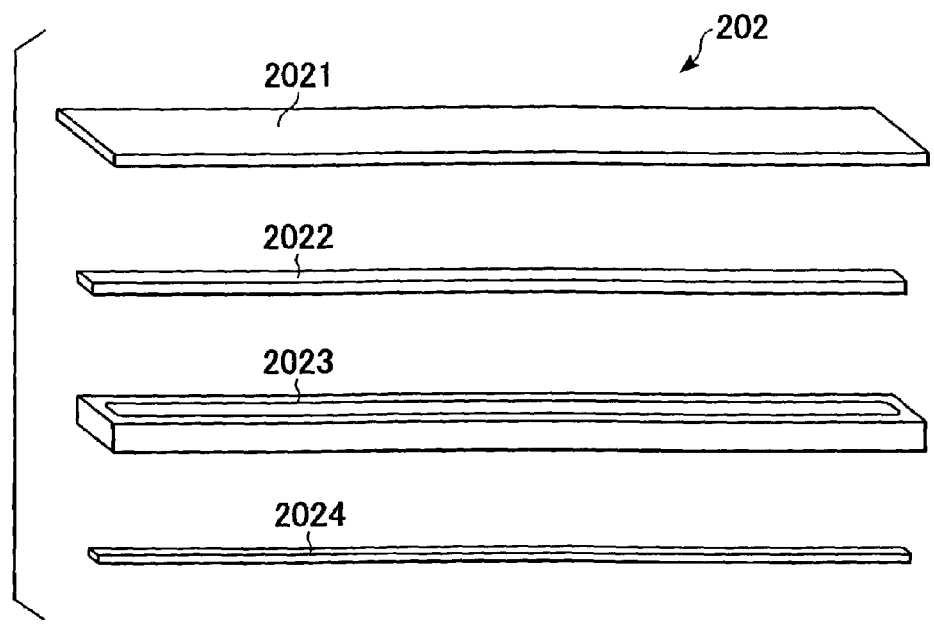
FIG. 4 is an exploded perspective view showing the CIS module 202.

Next, the CIS module 202 accommodated within the image scanner section 200 will be described. FIGS. 3 and 4 are a sectional view and an exploded perspective view of the structure of the CIS module 202, respectively.

The CIS module 202, as shown in FIGS. 3 and 4, comprises an illumination light source 2022 comprising a cover glass 2021, an LED, and an optical waveguide; a 1× magnification image-forming lens 2023 comprising a distributed index lens, such as a SELFOC™ lens; a color line sensor 2024; and a substrate 2025 having the color line sensor 2024 mounted thereon. These elements are integrated together with a mould 2026.

Figure 5:
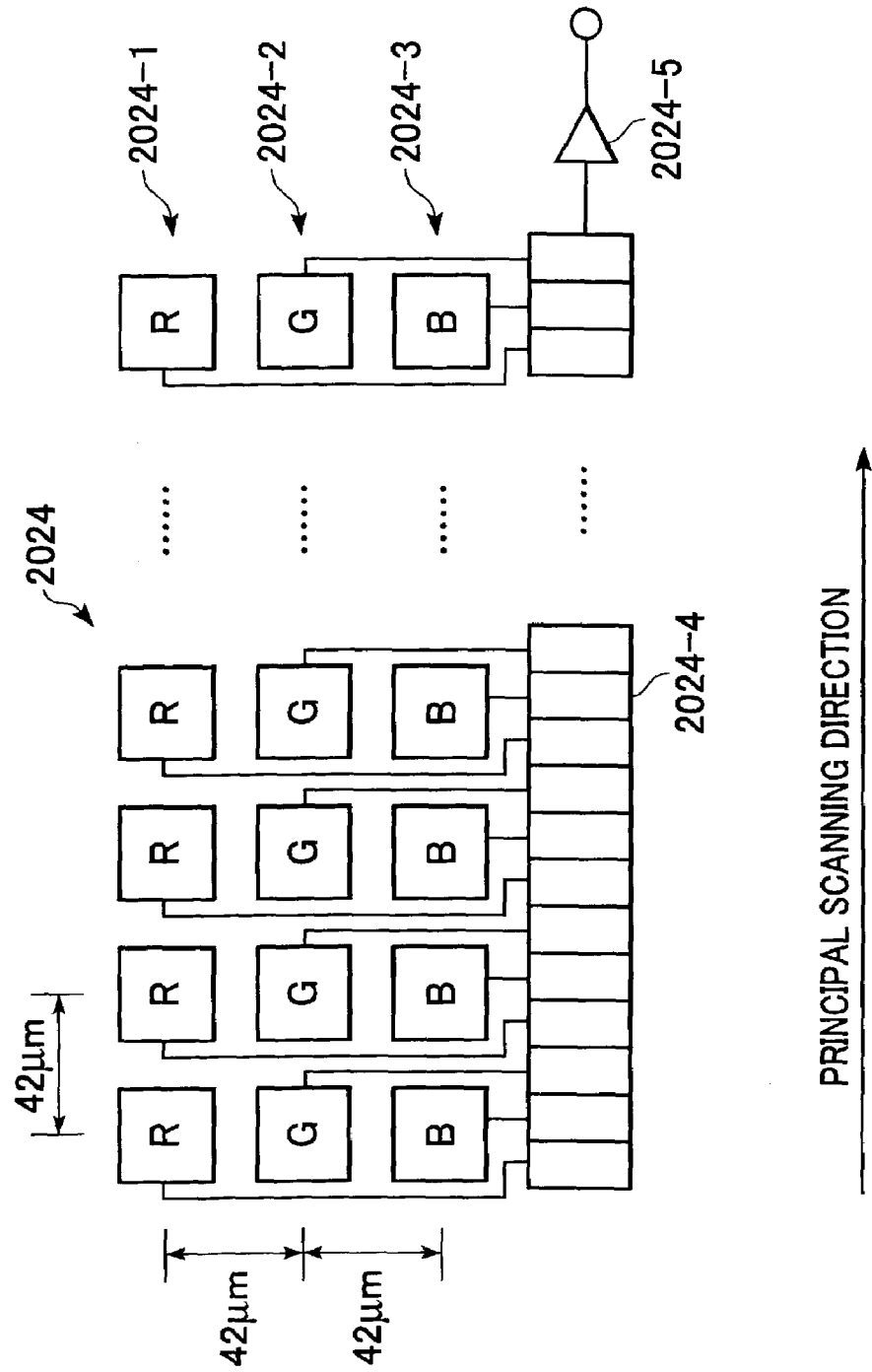
FIG. 5 is an enlarged schematic view of a color line sensor 2024 accommodated within the CIS module 202 showing its microscopic part.

FIG. 5 is an enlarged schematic view of the color line sensor 2024 accommodated within the CIS module 202 showing its microscopic part. Referring to FIG. 5, each rectangular shape expresses a photo-diode, which is a read pixel. The color line sensor 2024 is for reading with 1× magnification with a resolution of 600 dpi, and the size of an opening of one pixel is 42×42 μm.

On each photo-diode of the color line sensor 2024, color filters (not shown) of three primary color R, G, and B are provided. The photo-diode, having an R filter for transmitting a red wavelength component of visible light, is arranged in one line so as to form a photo-detector column (photo-sensor) 2024-1. Similarly, the photo-diodes, having G and B filters for respectively transmitting green and blue wavelength components, are arranged for each one line so as to form photo-detector columns 2024-2 and 2024-3. In such a manner, three read lines of R, G, and B are formed, and a charge is generated corresponding to luminous power incident into the photo-diode within a storage time.

The color line sensor 2024 is provided with a CCD analog shift-resister 2024-4 as a charge retransmitting section for retransmitting charges stored in the photo sensors 2024-1, 2024-2, and 2024-3; and an output amplifier 2024-5 for producing a voltage output signal by converting the charge signal produced by the CCD analog shift-resister 2024-4 into a voltage.

The above-mentioned three-line photo-detector columns 2024-1, 2024-2, and 2024-3, each having different optical characteristics, are arranged in parallel with each other so that the R, G, and B sensors read the same line of the original document. The CCD analog shift-resister 2024-4 is arranged outside the three-line photo-detector columns in parallel therewith and adjacently to the B photo-detector column 2024-3. These photo-detector columns 2024-1, 2024-2, and 2024-3, and the CCD analog shift-resister 2024-4 take a monolithic structure on the same silicon chip.

In a main scanning direction, according to the embodiment, each photo-diode is arranged to have a pixel pitch for each line in the main scanning direction of 42 μm so that the pixel pitch equals the opening size of one pixel in the main scanning direction. On the other hand, in a sub-scanning direction, according to the embodiment, each photo-diode is arranged to have a space between lines of 42 μm so that the space equals the opening size of one pixel in the sub-scanning direction.

Figure 6:
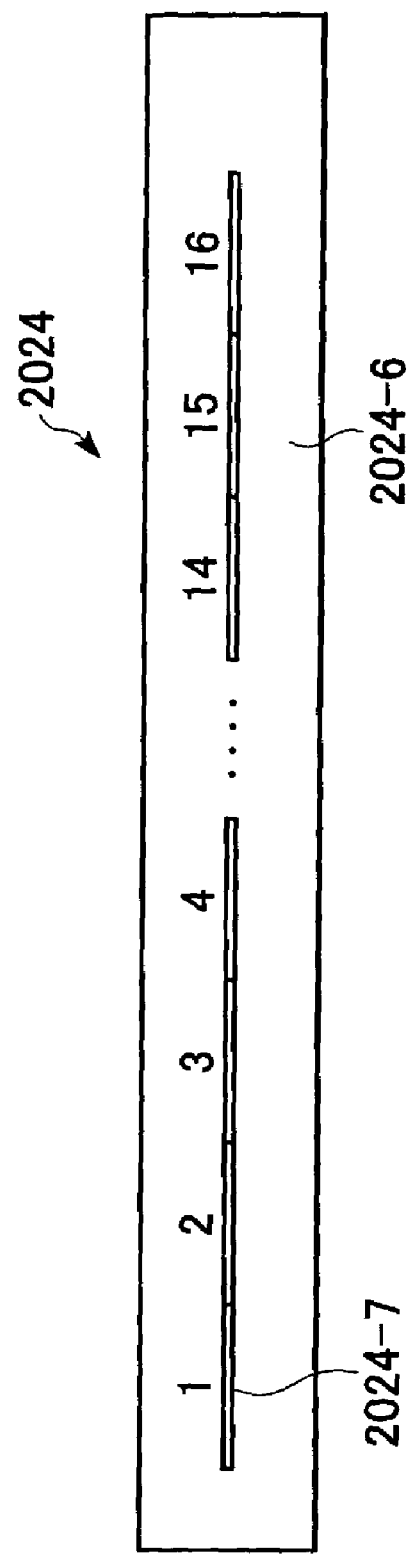
FIG. 6 is a schematic view of the color line sensor 2024 macroscopically showing the configuration thereof.

FIG. 6 is a schematic view of the color line sensor 2024 macroscopically showing the configuration thereof. On a substrate 2024-6, 16 sensor chips 2024-7 are mounted in a line. Since each sensor chip 2024-7 produces a signal, signals of 16 channels are simultaneously read corresponding to each chip.

Figure 7A:
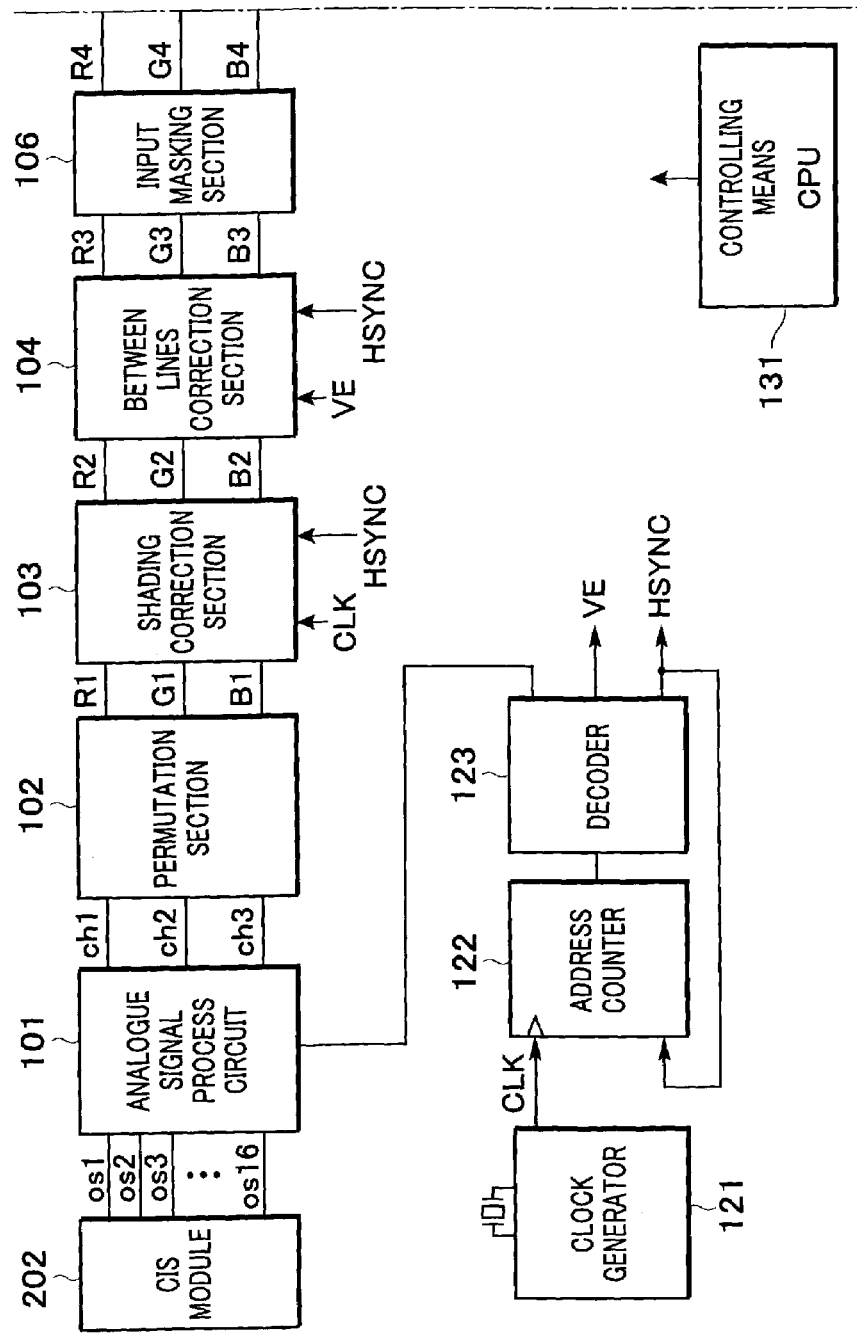
FIG. 7, which is comprised of FIGS. 7A and 7B, is a block diagram showing the configuration of the image-signal processing section 207 in the image scanner section 200.
Figure 7B:
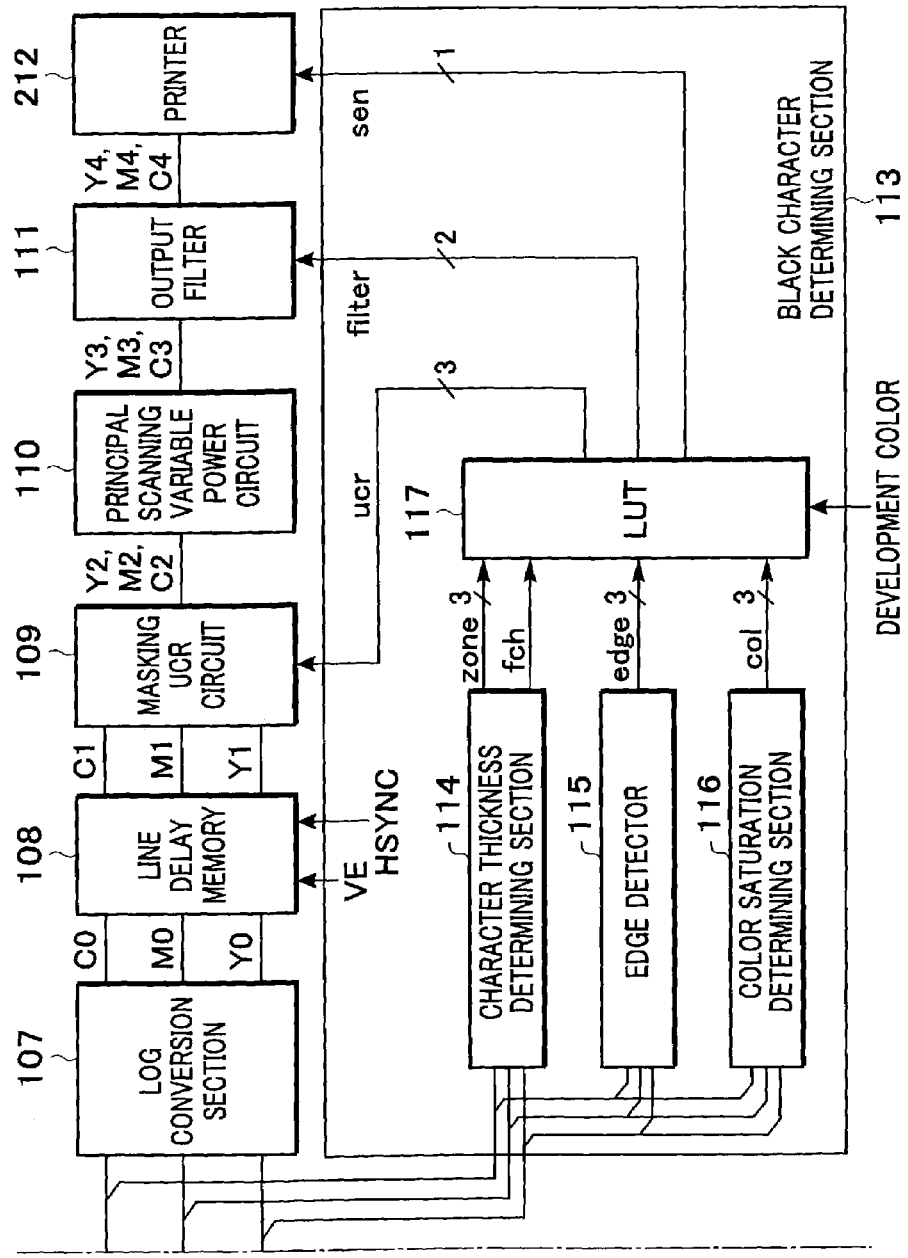

Then, the image-signal processing section 207 will be described. The image-signal processing section 207 performs various kinds of processing using a resister and a memory by the control means 131 comprising a CPU. FIG. 7 is a block diagram of the configuration of the image-signal processing section 207 in the image scanner section 200.

The image-signal processing section 207 comprises a clock generator 121 for generating a clock in one-pixel unit, a main scan address counter 122 for producing the pixel address output of one line by counting the clock from the clock generator 121, and a decoder 123 for producing various signals by decoding a main scan address produced by the main scan address counter 122. The main scan address counter 122 is cleared by a HSYNC signal produced from the decoder 123 so as to start counting the main scan address of the next line.

The image-signal processing section 207 is further provided with an analog signal processing section (analog signal processing circuit) 101 for producing the output of image signals with 16 channels OS1 to OS16 produced from the CIS module 202 by converting them into a digital signal with 8 bits after analog multiplexing and gain/offset adjusting the image signals OS1 to OS16; a permutation section 102 for dividing the digital signal with 8 bits produced from the analog signal processing section 101 into signals of color components R, G, and B; and a shading correction section 103 for performing shading correction on each color signal using a reading signal of a standard white board 211.

The image-signal processing section 207 is further provided with a between-lines correction section 104 for correcting spatial displacement in sub-scanning directions of color components R, G, and B; an input masking section 106 for converting a color space for reading signals R, G, and B read in the CIS module 202 into an NTSC (National Television System Committee) standard color space; a luminous-power/density conversion section (LOG conversion section) 107 for converting a lightness signal produced from the input masking section 106 into a density signal; and a black character determining section 113 for determining a reference region of the imported image is whether it is a character/drawing-line region or a dot image region so as to produce signals (a masking UCR coefficient control signal ucr, a space filter coefficient control signal filter, and a printer resolution control signal sen) based on the determined result. The image-signal processing section 207 also comprises a line delay memory 108 for delaying an image signal on the basis of a VE and a HSYNC; a masking UCR circuit 109 for calculating to correct the color muddiness of a coloring material in a printer 212 by extracting a black signal (BK) from density signals of the three primary colors based on a masking UCR coefficient control signal ucr; a main-scan variable magnification unit 110 for magnification/reduction of an image signal with a bit width of 8 bits and a black character determining signal produced from the masking UCR circuit 109 (masking UCR coefficient control signal ucr) in the main scanning direction; and a space filter processing section (output filter) 111 for switching edge emphasis processing or smoothing processing based on a space filter coefficient control signal filter. The space filter processing section (output filter) 111 is produced in a printer 212, which in turn performs printing based on a printer resolution control signal sen.

The black character determining section 113 has a known configuration as disclosed in Japanese Patent Laid-Open No. 7-203198, for example. That is, there are provided a character thickness determining section 114 for receiving a signal produced from the input masking section 106; an edge detector 115 and a color saturation determining section 116; and a look-up table (LUT) 117 for producing the masking UCR coefficient control signal ucr, the space filter coefficient control signal filter, and the printer resolution control signal sen, based on the output signals mentioned above.

Then, operation of the image-forming apparatus according to the embodiment will be described.

The color line sensor 2024 separates light information from an original document into color components R, G, and B and reads full color images ($2^{24}$ colors) so as to produce analog color signals R, G, and B to the image-signal processing section 207 via the wiring 208.

Reading sensor columns for each color of the color line sensor 2024, each having 7500 pixels, can read the original document on the glass plate 205 of the original document bed, with a resolution of 600 dpi along a length of 297 mm, which is the shorter direction length of the A-3 size, the maximum size placeable on the original document bed. The CIS module 202 moves mechanically by the driving force of the stepping motor 213 so as to scan the entire surface of an original document 204 in a direction (sub-scanning direction) perpendicular to the electrical scanning direction of the reading sensor column (main scanning direction).

The image-signal processing section 207 electrically separates the imported signal into components of magenta (M), cyan (C), yellow (Y), and black (BK), and sends them to the printing section 300. This processing method of the image signal is known, and the detail will be described later. One of the components M, C, Y, and BK is fed to the printer section 300 after single scanning of the original document in the image scanner section 200, so as to produce image data for one sheet by the original document scanning four-times in total, and images based on the image data are printed out from the printer section 300.

Specifically, in the printer section 300, an image signal with components of M, C, Y, and BK is fed to the laser driver 312 from the image scanner section 200. The laser driver 312 modulates the semi-conductor laser 313 corresponding to the image signal. The photosensitive drum 317 is scanned with a laser beam emitted from the semi-conductor laser 313 via the polygon mirror 314, the f-θ lens 315, and the mirror 316, so as to form an electrostatic latent image thereon.

The magenta developer 319, the cyan developer 320, the yellow developer 321, and the black developer 322 develop the electrostatic latent image with components of M, C, Y, and BK formed on the photosensitive drum 317 with corresponding toner by alternately touching the photosensitive drum 317. Then, a paper sheet fed from any one of the paper cassettes 324 and 325 is looped around the transfer drum 323, so as to transfer the toner image developed on the photosensitive drum 317 onto the paper sheet. In such a manner, the four-color toner images of M, C, Y, and BK are sequentially transferred onto the paper sheet, which in turn is discharged outside through the fuser 326.

The effect of providing the insulating members 210 and 211 will be described by comparing the behavior of the wiring 208 and the resultant unevenness and stripes of images when the insulating members 210 and 211 are provided, with those when the insulating members 210 and 211 are not provided.

First, a situation where the insulating members 210 and 211 are not provided will be described. FIGS. 8A to 8D are schematic views showing the relationship between the movement of the CIS module 202 and the behavior of the wiring 208 when the insulating members 210 and 211 are not provided.

Figure 8A:
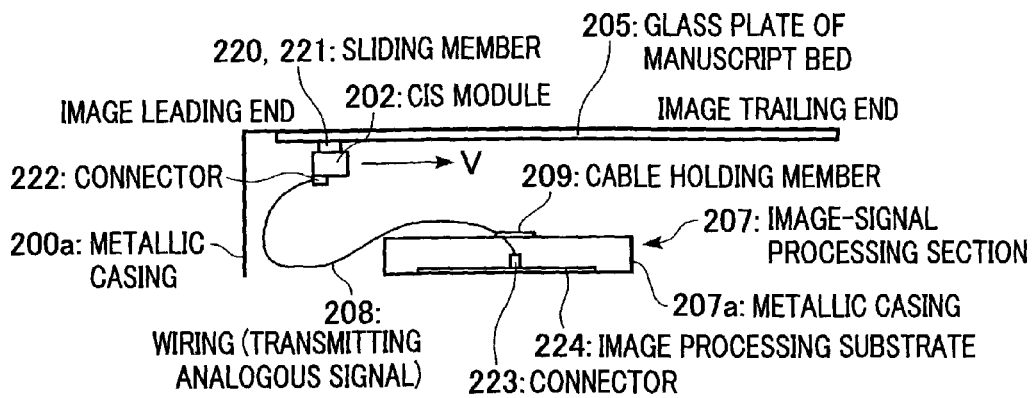
FIGS. 8A to 8D are schematic views showing the relationship between the movement of the CIS module 202 and the behavior of a wiring 208 when insulating members 210 and 211 are not provided.
Figure 8B:
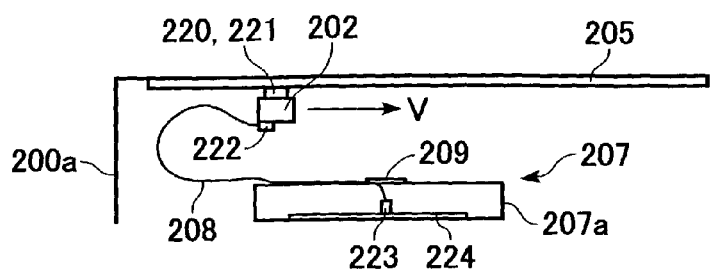

Before the scanning starts, as shown in FIG. 8B, the wiring 208, one end being connected to the CIS module 202 via the connector 222, droops so as to be curved and expanded in a direction separating from the image-signal processing section 207; the wiring 208 partly comes in contact with a corner of the metallic casing of the image-signal processing section 207; between this contact point and the cable holding member 209, the wiring 208 is curved so as to belly upward, and connected to an image-signal processing substrate 224 having an image-signal processing circuit (not shown) mounted thereon via the connector 223. The wiring 208 is also pushed on the surface of the metallic casing of the image-signal processing section 207 with the cable holding member 209.

If the sub-scanning of the image is started, the CIS module 202 moves toward the image-signal processing section 207. According to this movement, the curved portion (loop) of the wiring 208 existing on the image-signal processing section 207 is gradually reduced, and at one time finally, as shown in FIG. 8B, the curved portion is lost, and part of the wiring 208 is perfectly stuck on the metallic casing 207a of the image-signal processing section 207.

Figure 8C:
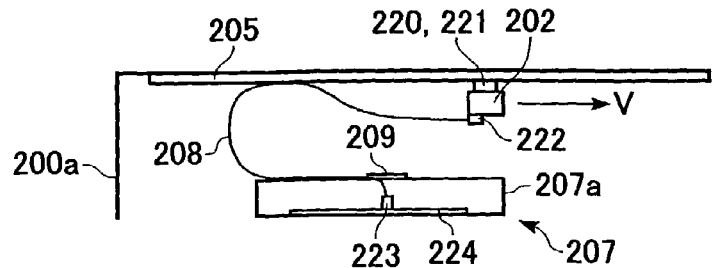

Then, as the CIS module 202 further moves, as shown in FIG. 8C, the wiring 208 comes in contact with the glass plate 205 at a position nearer to the scanning start position than the CIS module 202, and starts to be curved so as to belly downward by the gravity in between this contact point and the connector 222.

Figure 8D:
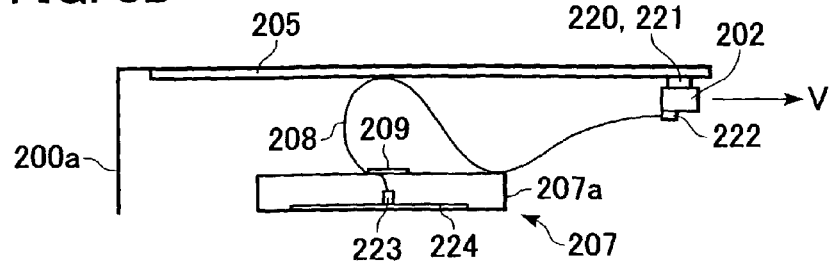

As the CIS module 202 moves furthermore, the region of the wiring 208 contacting with the metallic casing 207a of the image-signal processing section 207 is gradually reduced, so that the wiring 208 becomes contact with the image-signal processing section 207 only at a potion pushed by the cable holding member 209. The curved portion (loop) between the contact point of the wiring 208 to the glass plate 205 and the connector 222 is gradually increased, and at one time finally, as shown in FIG. 8D, the curved portion drops on and rebounds against the metallic casing of the image-signal processing section 207.

Figure 9:
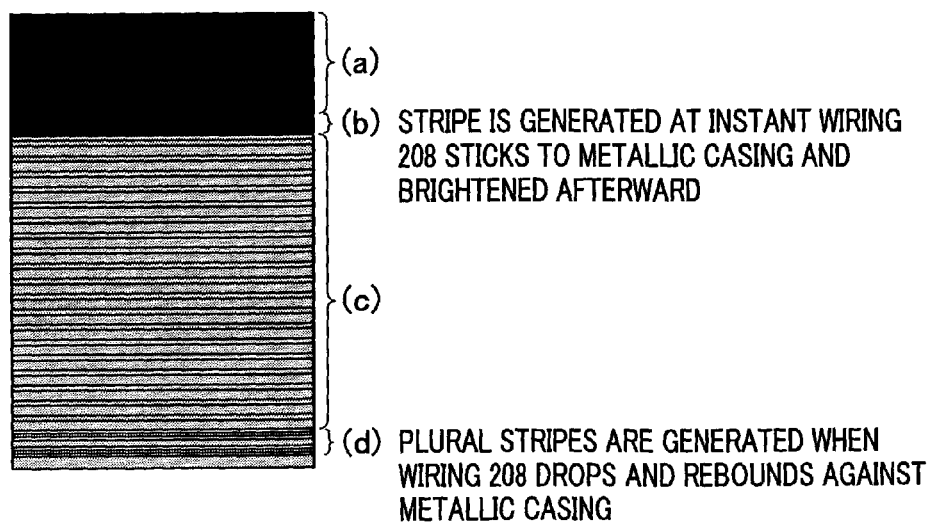
FIG. 9 is a drawing showing unevenness and stripes on the images obtained when the insulating members 210 and 211 are not provided.

FIG. 9 is a drawing showing unevenness and stripes on the images obtained from the operation described above. Symbols (a) to (d) in the drawing correspond to the states shown in FIGS. 8A to 8D, respectively. The drawing is obtained when reading an A-3 size halftone chart with an optical density D of 0.3.

The range (a) has rather dense reading; in the range (b), stripes are generated at an instant that the wiring 208 tightly comes into contact with the metallic casing; the range (c) has lighter (paler) reading than in the range (a); and in the range (d), a plurality of stripes are generated when the wiring 208 drops on and rebounds against the metallic casing.

That is, in between the wiring 208 transmitting an analog signal such as the FFC and the grounded metallic casing, when the wiring 208 is moved and deformed following the scanning, the electrostatic capacitance between both the members is changed. The waveform of the analog signal is thereby changed so as to produce deterioration in image quality such as unevenness and stripes.

The degree of the deterioration in image quality is no longer negligible, and as shown in FIG. 9, it is so remarkable as being visually and easily recognizable when reading a halftone chart with an optical density D of 0.3, significantly reducing the commodity value.

As mentioned above, the resin casing of the image-signal processing section has not such a problem, so that the problem is inherent to the case using the metallic casing.

Figure 10:
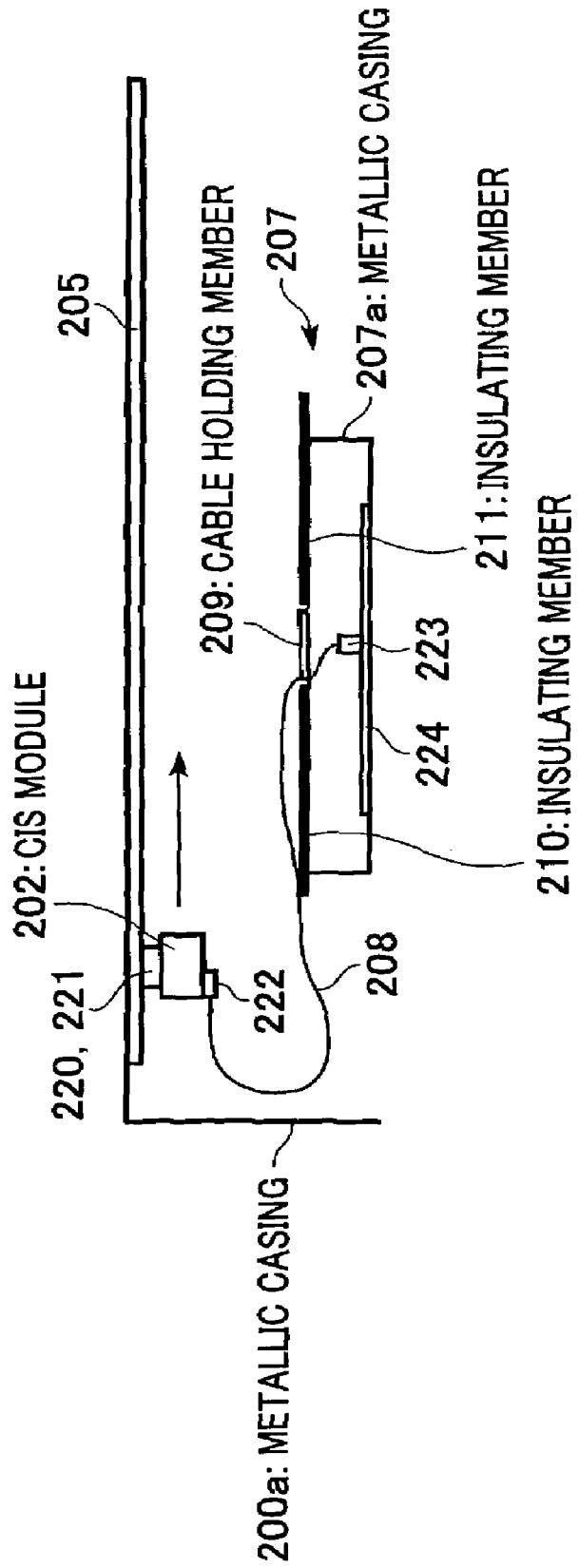
FIG. 10 is a schematic view showing a situation prior to scanning starting when the insulating members 210 and 211 are provided.

Next, a situation where the insulating members 210 and 211 are provided will be described. FIG. 10 is a schematic view showing a situation prior to the scanning when the insulating members 210 and 211 are provided. In the example shown in FIG. 10, the insulating member 210 was arranged at a position nearer to the scanning start position than to the cable holding member 209, while the insulating member 211 was arranged at a position nearer to the scanning completion position. As the insulating members 210 and 211, polyethylene terephthalate (Mylar™ sheet) with a thickness of 0.1 mm was used.

Figure 11:
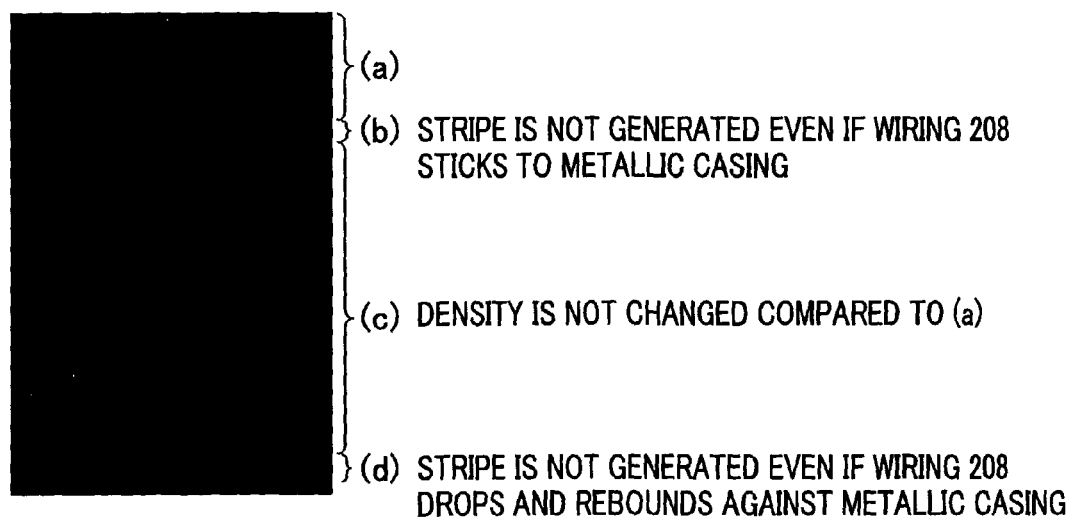
FIG. 11 is a drawing showing unevenness and stripes on the images obtained when the insulating members 210 and 211 are provided.

The relationship between the movement of the CIS module 202 and the behavior of the wiring 208 was the same as those shown in FIGS. 8A to 8D. FIG. 11 is a drawing showing unevenness and stripes of the images obtained when the insulating members 210 and 211 are provided. Symbols (a) to (d) in the drawing correspond to the states shown in FIGS. 8A to 8D, respectively. The drawing is also obtained when reading an A-3 size halftone chart with an optical density D of 0.3.

As shown in FIG. 11, the unevenness and stripes existing in FIG. 9 are not absolutely generated, obtaining extremely excellent images.

Figure 12:
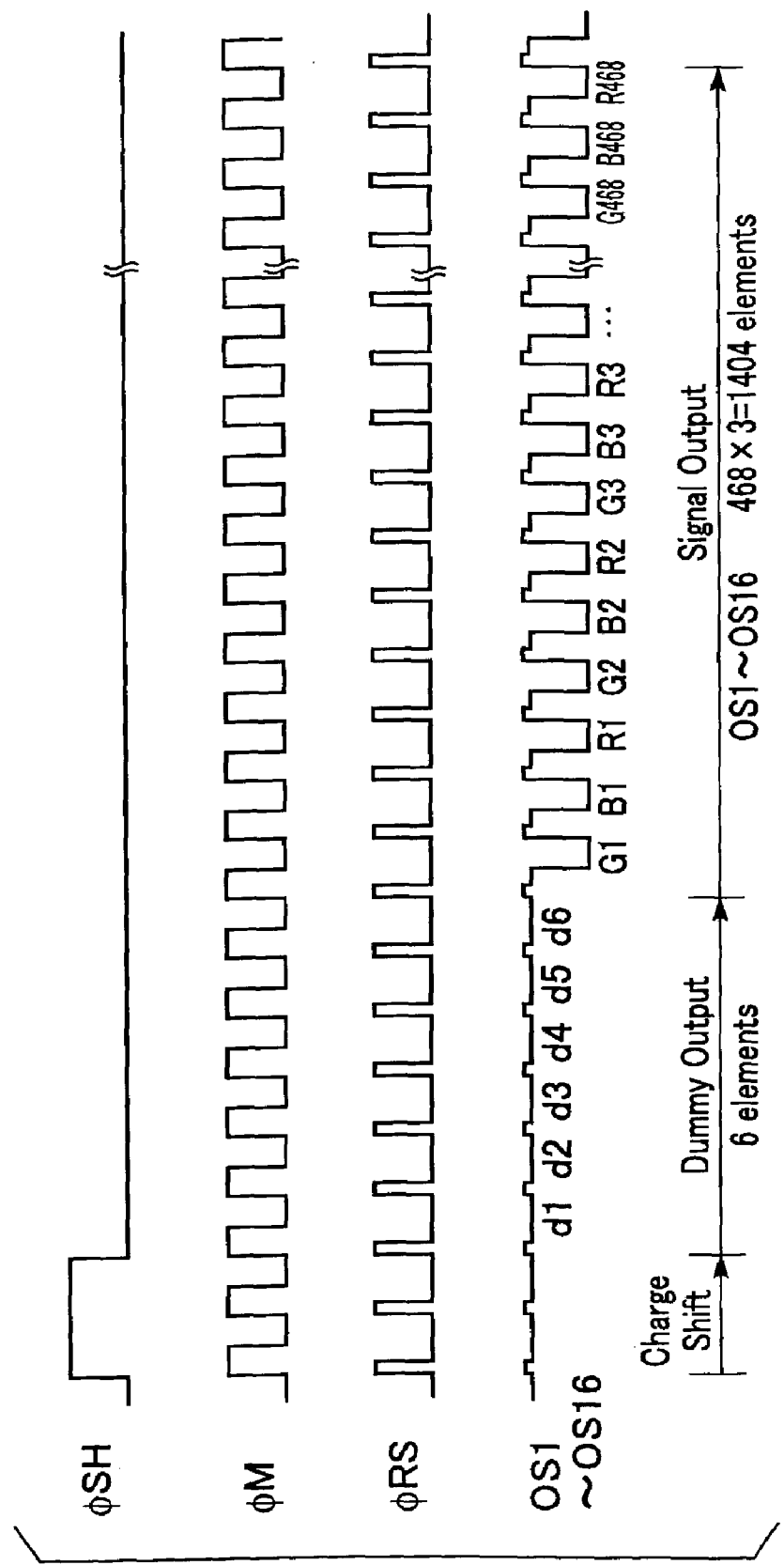
FIG. 12 is a timing chart showing the reading operation of an image signal in the CIS module 202.

Then, a processing method of an image signal in the image-signal processing section 207 will be described. FIG. 12 is a timing chart showing the reading operation of an image signal in the CIS module 202.

For the one-line period of time (350 μs, for example), a charge for one-line with color components R, G, and B, which are accumulated in the respective photo-detector columns (photo-sensors) 2024-1, 2024-2, and 2024-3, is generally transferred to the CCD analog shift-resister 2024-4, which is a charge transferring section, at the head timing of the next line corresponding to a shift pulse φSH.

Then, a signal φRS rises corresponding to a charge transferring clock φM so that the charge received in the charge transferring section 2024-4 is sequentially transferred to the output amplifier 2024-5, in which the charge is converted into a voltage and produced as a voltage output signal. At this time, dummy signals d1 to d6 for 6 pulses are read out every 16 channels in the output amplifier 2024-5. Next, effective signals are read out by 468 pixels for each color by the repetition of colors R, G, and B, as a manner of G1, B1, and R1; G2, B2, and R2; . . . ; and G468, B468, and R468. According to the embodiment, since the one-line CCD analog shift-resister, provided commonly to the three-line photo-detector columns, transmits the charge with three-color components, such reading timing is taken.

Thereafter, the image signals with 16 channels are transferred to the image-signal processing section 207 via the wiring 208.

In the image-signal processing section 207, as shown in FIG. 7, a clock generator 121 generates a clock CLK in one-pixel unit, and a main-scan address counter 122 keeps counting of the number of clocks from the clock generator 121 so as to produce the one-line pixel address output. A decoder 123 decodes the main-scan address from the main-scan address counter 122 so as to produce a sensor drive signal in one-line unit such as a shift pulse and a reset pulse, and an effective region signal VE, representing an effective region in the one-line reading signal from a color image sensor, and a line synchronizing signal HSYNC. The main-scan address counter 122 is cleared by the line synchronizing signal HSYNC so as to start counting the main-scan address of the next line.

Image signals with 16 channels OS1 to OS16 produced from the CIS module 202 are entered into an analog signal process section 101. The analog signal process section 101 analog-multiplexes the image signals so as to allocate the image signals OS1 to OS6 to ch1, the image signals OS7 to OS12 to ch2, and the image signals OS13 to OS16 to ch3. After gain and offset adjustments, the analog image signals are converted into digital image signals with 8 bits by a built-in A/D converter so as to produce them. According to the embodiment, since the output from each sensor chip 2024-7 of the CIS module 202 is 1 channel, as described above, the number of channels of the reading output can be reduced even when a plurality of sensor chips are arranged, as compared with conventional configurations. Therefore, wiring for processing produced image signals and a circuit scale of an analog processor can be simplified.

The digital image signals ch1 to ch3 with 8 bits produced from the analog signal processing section 101 are separated into signals R1, G1, and B1 with color components R, G, and B in a permutation section 102. Then, on each color signal, a known shading correction using reading signals of a standard white board 206 is performed in a shading correction section 103. The standard white board 206 is a white board having substantially uniform reflection characteristics in visible light. On the basis of data read out from the standard white board 206, shading correction is performed on original-document reading data produced from the respective photo-detector columns (photo-sensors) 2024-1 to 2024-3 for color components R, G, and B.

The spatial displacements of R, G, and B in the sub-scanning direction of the shading-corrected color signals of R, G, and B are corrected in a between-lines correction section 104. In the CIS module 202 according to the embodiment, as shown in FIG. 5, the three-line photo-detector columns (photo-sensors) 2024-1, 2024-2, and 2024-3 are arranged in parallel with each other leaving a predetermined space in between (42 μm being equal to the opening size of one pixel in the sub-scanning direction). As the lines of R, G, and B are displaced by one-pixel in the sub-scanning direction in such a manner, different positions in the sub-scanning direction are simultaneously read, so that it is necessary to be corrected for taking the same position as image data. Therefore, the correction is performed thereon using the known so-called 3-line correction technique.

This 3-line correction is used as an essential technique when an existing color 3-line CCD is used. Generally, a technique is taken in that the image signal of the previously read out line (B signal according to the embodiment) is stored in a memory so as to align it with the image signals of the other two lines, which are read in retard, (R signal and G signal according to the embodiment). In such a manner, by aligning the R and G signals, which are delayed relative to the B signal in the sub-scanning direction, with the B signal, the spatial displacement is corrected.

In the CIS module 202 used according to the embodiment, since spaces between the three reading lines of R, G, and B are the one-pixel pitch, which is an integer multiple of the pixel size in the sub-scanning direction, the correction process can be simplified. As long as the space is an integer multiple of the one pixel size in the sub-scanning direction, the lines may be arranged at intervals of double or triple (two or three pixels).

Output signals R3, G3, and B3 of the between-lines correction section 104 are entered into the input masking section 106. In the input masking section 106, in order to convert the color space of the reading signals of R, G, and B, which are read out in the CIS module 202, into a standard color space of NTSC, the matrix arithmetic operation is performed according to the following equation 1.

$$\begin{pmatrix} R4 \\ G4 \\ B4 \end{pmatrix} = \begin{pmatrix} a11 & a12 & a13 \\ a21 & a22 & a23 \\ a31 & a32 & a33 \end{pmatrix} \begin{pmatrix} R3 \\ G3 \\ B3 \end{pmatrix} \qquad \text{[Numerical Formula 1]}$$

Wherein values of a11, a12, a13, a21, a22, a23, a31, a32, and a33 are determined so that the color reproducibility in the NTSC color space is optimized.

Lightness signals R4, G4, and B4 produced from the input masking section 106 are converted into density signals C0, M0, and Y0 by the luminous-power/density conversion section (LOG conversion section) 107 configured by the look-up table ROM, and are received in the black character determining section 113.

The black character determining section 113 determines a reference region of the imported image is whether it is a character/drawing-line region or a dot image region. If it is determined to be the character/drawing-line region, the black character determining section 113 produces a command to increase the black color to the masking UCR circuit 109 as a masking UCR coefficient control signal ucr (3 bits); produces a command to emphasize the contour to the output filter 111 as a space filter coefficient control signal filter (2 bits); and produces a command to switch the produced print screen ruling into a fine screen ruling to the printer 212 as a printer resolution control signal sen (1 bit). As a result, a black character/drawing-line is conspicuously printed beautifully. On the other hand, if the reference region is determined to be the dot image region, the black character determining section 113 produces a command to make the dot opaque to the output filter 111 as the space filter coefficient control signal filter; and produces a command to switch the produced print screen ruling into an excellent gradation-reproducibility ruling to the printer 212 as the printer resolution control signal sen. The details thereof are disclosed in Japanese Patent Laid-Open No. 7-203198.

The line delay memory 108 delays image signals C0, M0, and Y0 by the line delay until a black character determining signal produced in the black character determining section 113, such as a masking UCR coefficient control signal ucr, a space filter coefficient control signal filter, and a printer resolution control signal sen. As a result, the image signals C0, M0, and Y0 and the black character determining signal (masking UCR coefficient control signal ucr), which are for the common pixel, are simultaneously entered into the masking UCR circuit 109.

The masking UCR circuit 109 extracts a black signal (BK) from imported three primary color signals Y1, M1, and C1, and further performs arithmetic operation for correcting color muddiness of a color material in the printer 212 based on the masking UCR coefficient control signal ucr. Then, image signals Y2, M2, C2, and BK2 are sequentially produced every reading operation with a predetermined bit width (8 bits).

The main-scan variable magnification unit 110 performs magnification/reduction of the image signals Y2, M2, C2, and BK2 and the black character determining signal (masking UCR coefficient control signal ucr) in the main scanning direction by a known interpolation calculation, so as to produce image signals Y3, M3, C3, and BK3.

The space filter processing section (output filter) 111 performs switching of edge emphasis processing or smoothing processing on the image signals Y3, M3, C3, and BK3, based on the space filter coefficient control signal filter produced from the LUT 117, so as to produce processed image signals Y4, M4, C4, and BK4 to the printer 212.

According to the embodiment, the casing 207a of the image-signal processing section 207 and the casing 200 of the printer section 200 are metallic; however, the scope of the present invention is not limited to this and we obviously have a concept of variation in electrostatic capacitance due to relative positional displacement between the wiring such as the FFC and the metallic casing. Therefore, in the case where the wiring 208 can come into contact with the internal surface of the metallic casing 200a, an insulating member may be used on the region.

The thickness of the insulating member is not limited to the value described above; however, more than about 0.1 mm may be preferable, and the larger in thickness, the more advantages can be obtained. The shape of the insulating member is not limited to a sheet to be bonded on the metallic casing, and it may be molded integrally with the metallic casing as an insulating molded member.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image-reading apparatus comprising:
    a scan-reading unit having a line sensor mounted thereon for converting light from an original document into an image signal;
    a moving unit for moving said scan-reading unit along the original document;
    an image-signal processing circuit for processing an image signal output from said scan-reading unit;
    a wiring cable for conducting the image signal output from said scan-reading unit to an input of said image-signal processing circuit;
    a first metallic casing for accommodating said image-signal processing circuit;
    a second metallic casing for accommodating said first metallic casing for accommodating said image-signal processing circuit, said scan-reading unit, and said wiring cable; and
    an insulating member formed on a region, to which said wiring cable might come close, of an external surface of said first metallic casing, said wiring cable contacting said insulating member when said moving unit moves said scan-reading unit.

2. An apparatus according to claim 1, wherein one end of said wiring cable is connected to said scan-reading unit and the other end is connected to said image-signal processing circuit, while an intermediate portion of said wiring cable is fixed on a surface of said first metallic casing nearer to the original document.

3. An apparatus according to claim 2, wherein a fixing point of said wiring cable to said first metallic casing is located at a substantial center of the surface of said first metallic casing nearer to the original document.

4. An apparatus according to claim 3, further comprising a second insulating member formed in a region of an internal surface of said second metallic casing, said wiring cable contacting said second insulating member when said moving unit moves said scan-reading unit.

5. An apparatus according to claim 4, wherein said second insulating member and another insulating member are further arranged in regions, to which said wiring cable might come close, on the internal and external surfaces of said second metallic casing, respectively.

6. An apparatus according to claim 3, wherein said insulating member and another insulating member are arranged in a sub-scanning direction, and both in front and rear of the fixing point on the surface of said first metallic casing, respectively.

7. An apparatus according to claim 1, further comprising a second insulating member formed in a region of an internal surface of said second metallic casing, said wiring cable contacting said second insulating member when said moving unit moves said scan-reading unit.

8. An apparatus according to claim 7, wherein said second insulating member and another insulating member are further arranged in regions, to which said wiring cable might come close, on the internal and external surfaces of said second metallic casing, respectively.

9. An image-reading apparatus comprising:
- a scan-reading unit having a line sensor mounted thereon for converting light from an original document into an image signal;
- a moving unit for moving said scan-reading unit along the original document;
- an image-signal processing circuit for processing an image signal output from said scan-reading unit;
- a wiring cable for conducting the image signal output from said scan-reading unit to an input of said image-signal processing circuit;
- a metallic casing for accommodating said image-signal processing circuit; and
- an insulating member formed on a region, to which said wiring cable might come close, of an external surface of said metallic casing, said wiring cable contacting said insulating member when said moving unit moves said scan-reading unit.

* * * * *